United States Patent [19]
Mroz

[11] Patent Number: 6,018,457
[45] Date of Patent: Jan. 25, 2000

[54] LOCKING BRACKET FOR A DRIVE HOUSING AND METHOD OF ASSEMBLY

[75] Inventor: Steven M. Mroz, Streamwood, Ill.

[73] Assignee: Hon Hai Precision Ind. Co., Ltd., Taipei Hsien, Taiwan

[21] Appl. No.: 08/969,805

[22] Filed: Nov. 13, 1997

[51] Int. Cl.[7] .................................................. G06F 1/16
[52] U.S. Cl. ...................... 361/685; 361/726; 361/725; 361/727
[58] Field of Search .................................. 361/685, 725, 361/683, 724, 727, 726; 312/223.2, 223.1, 263, 257.1; 248/225.11, 291.1

[56] References Cited

U.S. PATENT DOCUMENTS

| | | | |
|---|---|---|---|
| 5,041,924 | 8/1991 | Blackborow et al. | 361/685 |
| 5,100,215 | 3/1992 | Cooke et al. | 312/257.1 |
| 5,124,885 | 6/1992 | Liu | 312/263 |
| 5,233,594 | 8/1993 | Wilhelm | 361/685 |
| 5,680,293 | 10/1997 | McAnally et al. | 361/685 |
| 5,761,030 | 6/1998 | Roscoe | 361/684 |

*Primary Examiner*—Donald Sparks
*Assistant Examiner*—John D. Reed

[57] ABSTRACT

A drive housing fixing means comprises an elongate locking bracket, a thumbscrew and a bolt. The locking bracket defines a first hole in a first end and forms a bend on a second end for being received in a slot defined in a computer chassis whereby the locking bracket is pivotably mounted to the chassis. A base plate is integrally formed with the chassis and defines a notch in a left portion thereof. A drive cage is mounted to a bottom surface of the base plate and a drive box is slidably received between the chassis and the top surface of the base plate. The bolt is fixedly received in a second hole defined in a left side wall of the drive cage and extends outside the drive cage. The locking bracket pivots downward to be received in the notch and to receive the bolt in the first hole thereof. The thumbscrew threadedly engages with the bolt to secure the locking bracket between the left side wall of the drive cage and the thumbscrew. Therefore, the drive cage and the drive box are securely received within the computer chassis in position.

10 Claims, 5 Drawing Sheets

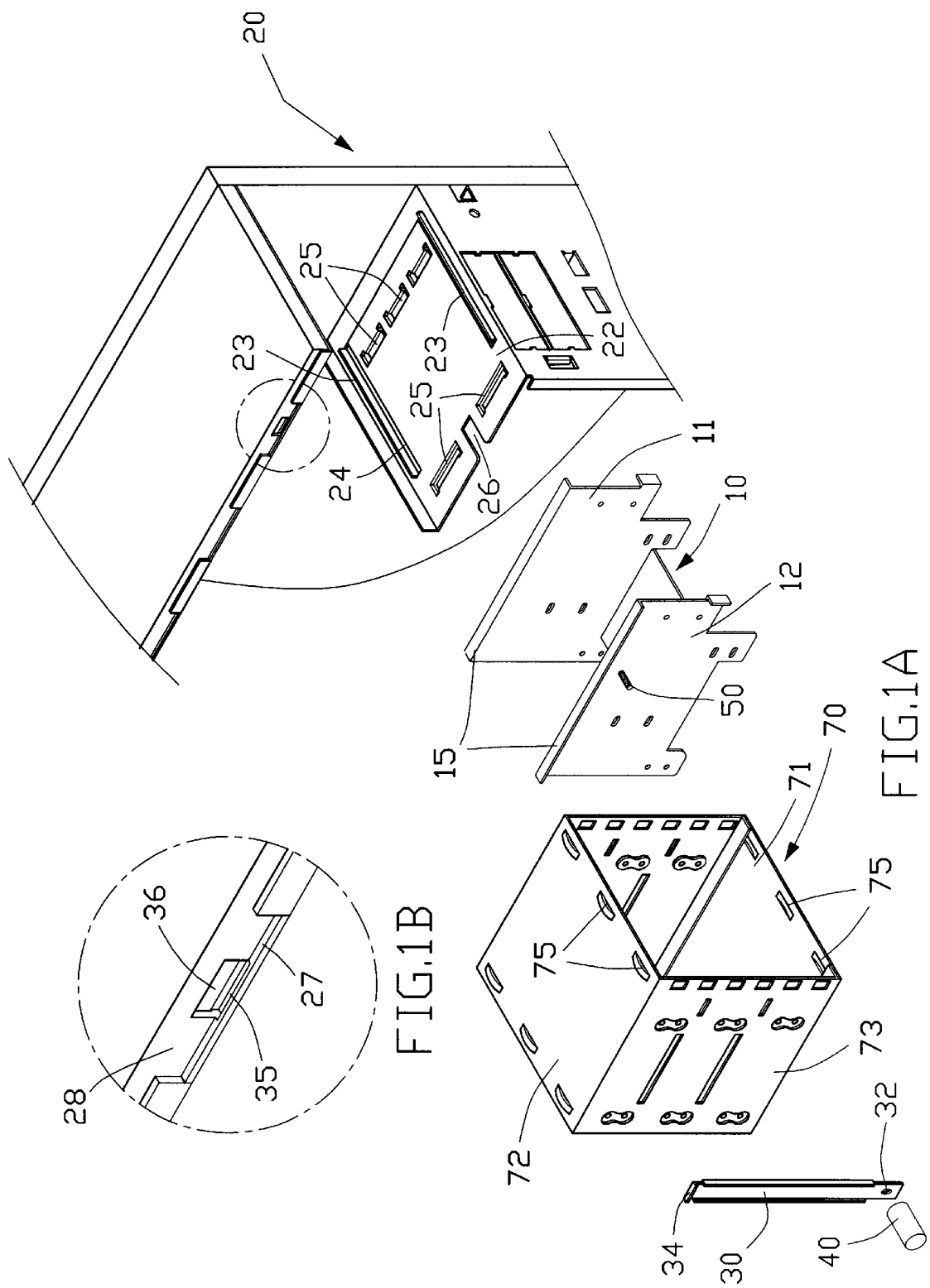

LOCKING BRACKET FOR A DRIVE HOUSING AND METHOD OF ASSEMBLY

BACKGROUND OF THE INVENTION

1. Field of the Invention

The present invention relates to a fixing means for a computer enclosure, particularly to a locking bracket for fixing a drive housing to a computer enclosure chassis and the method of assembling the drive housing and locking bracket with the computer enclosure.

2. The Prior Art

Personal computers commonly utilize Disc Operating System (DOS) based hardware to organize and access information stored in the computer, such as software programs and files. The main components of a DOS-based system are hard disc drives formed from heavy electromagnetic material which store the information. A drive housing for receiving and securely fixing the hard disc drives, floppy disc drives, and a CD-ROM must be stably mounted to a chassis of the computer enclosure.

Prior art fixing means for mounting the drive housing of the computer to the chassis utilize a variety of different components including at least a number of brackets and mounting screws extending through corresponding holes defined in the brackets, drive housing and chassis and threadedly engaging with nuts thereby allowing the brackets to support the drive housing within the chassis. Such fixing means have previously been disclosed in U.S. Pat. Nos. 5,112,119, 5,164,886 and 5,447,367.

Since this mounting method requires the creation of a number of holes and the proper alignment of the brackets before insertion of the screws and engagement with the nuts, assembly becomes laborious and time-inefficient thus increasing manufacturing costs. Furthermore, if the disc drives or CD-ROM require service due to a malfunction thereof, access is troublesome since the screws, nuts and brackets must all be completely removed before the disc drives and CD-ROM can be withdrawn for inspection and repair.

Hence, there is a need for a simplified drive housing fixing means to eliminate the above mentioned drawbacks of existing mounting mechanisms.

SUMMARY OF THE INVENTION

Accordingly, an objective of the present invention is to provide a fixing means to mount a drive housing to a computer chassis, wherein the drive housing can be easily assembled with or removed from the chassis without the use of external tools.

Another objective of the present invention is to provide a drive housing fixing means having only one locking bracket and requiring only one thumbscrew thereby simplifying the structure of the fixing means.

A further objective is to provide a drive housing fixing means having a locking bracket pivotably mounted to the chassis at one end to hasten the assembly and removal of the drive housing.

To fulfill the above mentioned objectives, according to an aspect of the present invention, a drive housing fixing means comprises an elongate locking bracket, a thumbscrew and a bolt. The locking bracket defines a first hole in a first end and forms a bend on a second end for being received in a slot defined in a first wall of a computer chassis whereby the locking bracket is pivotably mounted to the chassis. A cutout is defined in a second wall of the chassis to provide the bend with clearance so that the locking bracket can pivot at least ninety degrees with respect to the first wall. A base plate is integrally formed with the chassis and defines a notch in a left side portion thereof for receiving the first end of the locking bracket. A drive box is slidably received between the chassis and a top surface of the base plate and a drive cage is mounted to a bottom surface of the base plate. The drive cage defines a second hole in a left side wall thereof for fixedly receiving the bolt which extends outside the drive cage.

The first hole, the slot, the second hole, the notch and the cutout are all defined in aligning positions so that the locking bracket pivots downward to abut a left surface of the drive box and the left side wall of the drive cage, and receives the bolt in the first hole thereof. The thumbscrew threadedly engages with the bolt to secure the locking bracket between the left side wall of the drive cage and the thumbscrew. Therefore, the drive cage and the drive box are securely received within the computer chassis.

BRIEF DESCRIPTION OF THE DRAWINGS

FIG. 1A is a perspective exploded view of a portion of a computer chassis showing the fixing means of the present invention;

FIG. 1B is an enlarged view of a slot and a cutout defined in the computer chassis taken from the circled phantom portion of FIG. 1A;

DETAILED DESCRIPTION OF THE PREFERRED EMBODIMENT

Figure 2A:
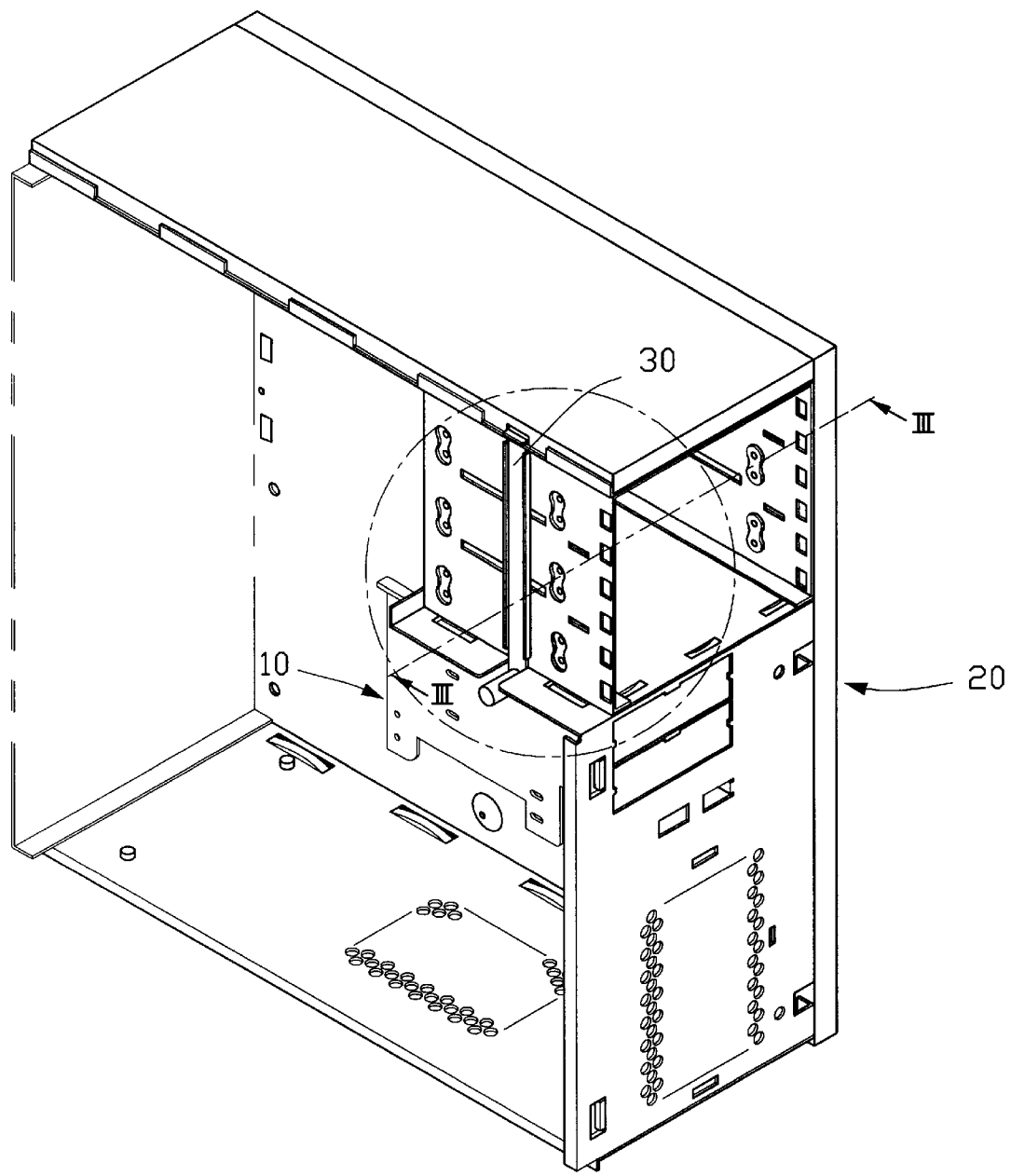
FIG. 2A is a perspective view of the assembled computer chassis showing the fixing means of the present invention.

The present invention will now be described in detail with reference to the preferred embodiment as shown in FIGS. 1A to 4.

Referring first to FIGS. 1A and 1B, a drive housing fixing means for firmly mounting a U-shaped drive cage 10 and a square drive box 70 to a computer enclosure chassis 20 comprises an elongate locking bracket 30, a thumbscrew 40 and a bolt 50. The locking bracket 30 defines a first hole 32 in a first end and forms a bend 34 on a second end thereof.

The drive cage 10 forms a right side wall 11, a left side wall 12, and a guiding bar 15 at the top of each side wall 11, 12. The left side wall 12 defines a second hole (not shown) for fixedly receiving the bolt 50 which extends outside the drive cage 10.

The drive box 70 consists of a bottom surface 71, a top surface 72, a left surface 73, and a right surface 74. Both the bottom surface 71 and the top surface 72 form a plurality of in-line projections 75 on front and rear portions thereof protruding outside the drive box 70.

A slot 35 and a cutout 36 are respectively defined in a first wall 27 and a second wall 28 of the computer chassis 20. A base plate 22 integrally formed with the chassis 20 forms two guiding rails 23 on front and rear portions thereof, respectively, having free ends extending above the surface of the base plate 22, and two guiding slots 24 are defined adjacent to the guiding rails 23. The first wall 27 of the chassis 20 also forms two guiding rails (not shown) having free ends extending toward the base plate 22 and defines two guiding slots (not shown) adjacent to the guiding rails. The base plate 22 further defines a notch 26 in a left portion thereof and forms split bending tangs 25 on the left portion and a right portion having free ends extending below the surface and toward the center of the base plate 22. Retaining slots 29 are defined between the bending tangs 25 and the base plate 22.

Figure 2B:
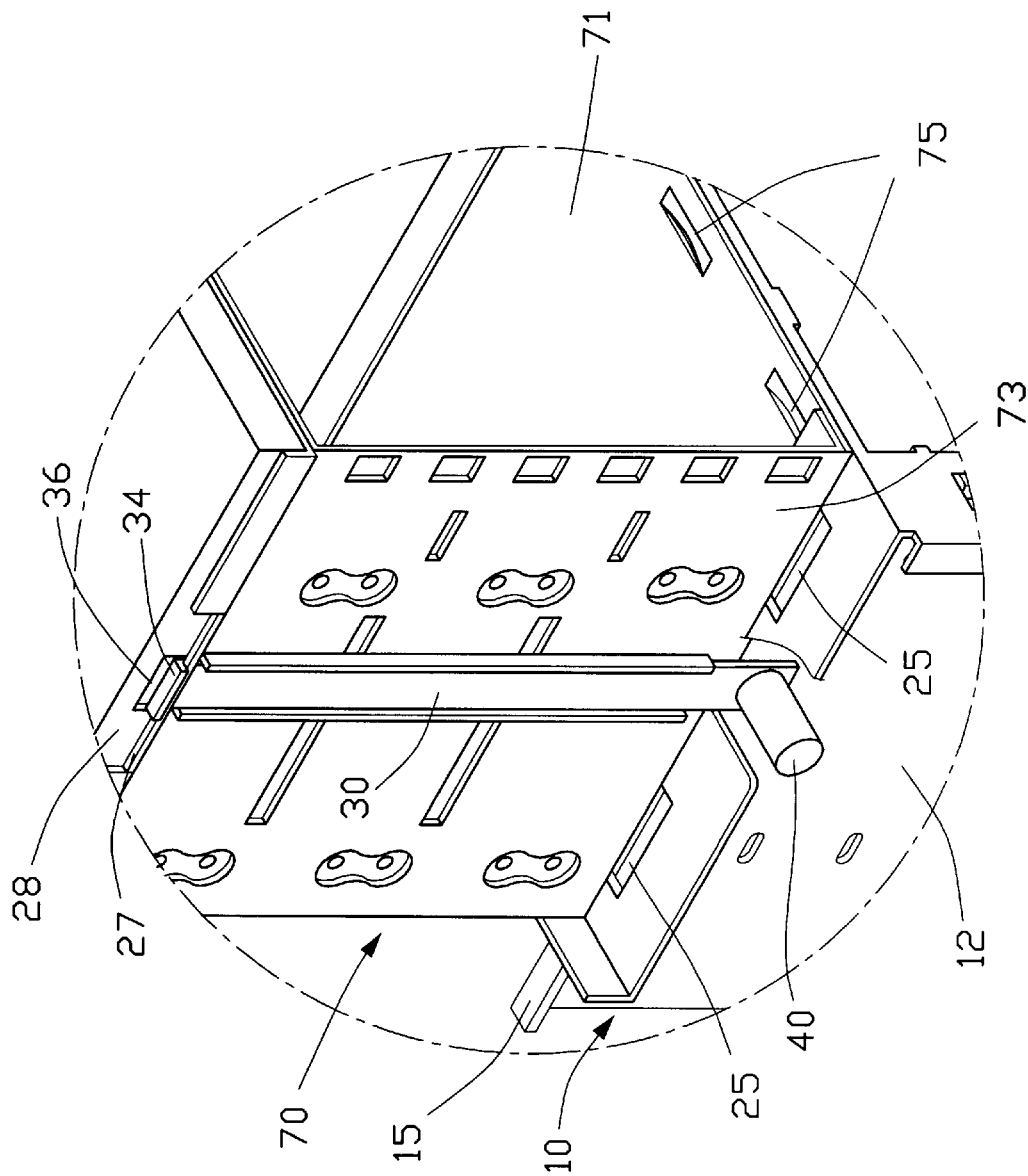
FIG. 2B is an enlarged view of the fixing means taken from the circled phantom portion of FIG. 2A with a portion of the base plate cut away to expose the entire locking bracket and thumbscrew.
Figure 3B:
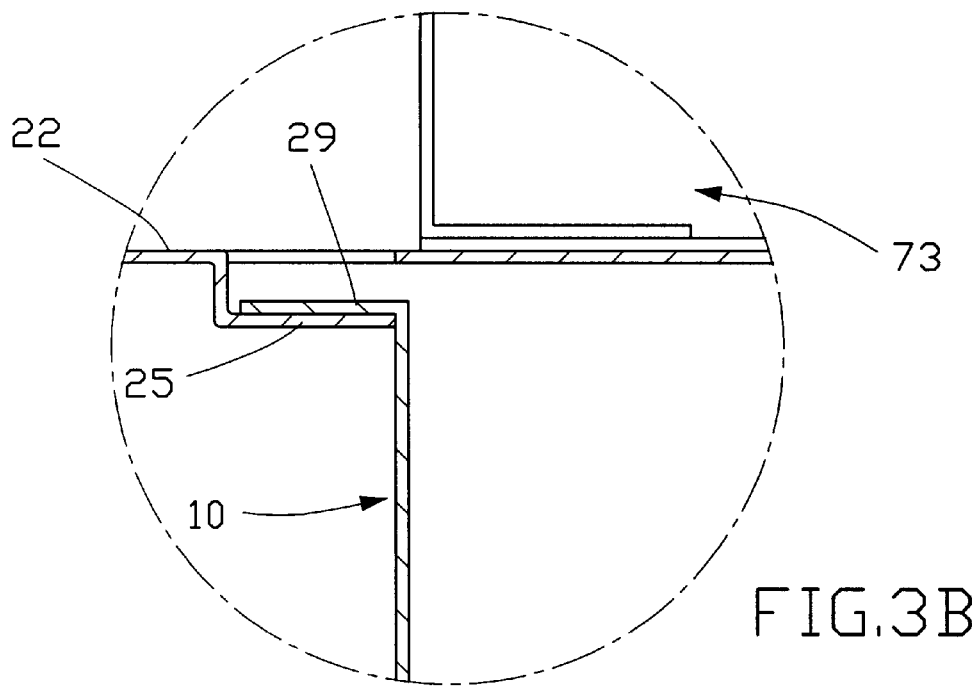
FIG. 3B is an enlarged view of the circled phantom portion of FIG. 3A showing how the drive cage is mounted to the base plate.
Figure 3A:
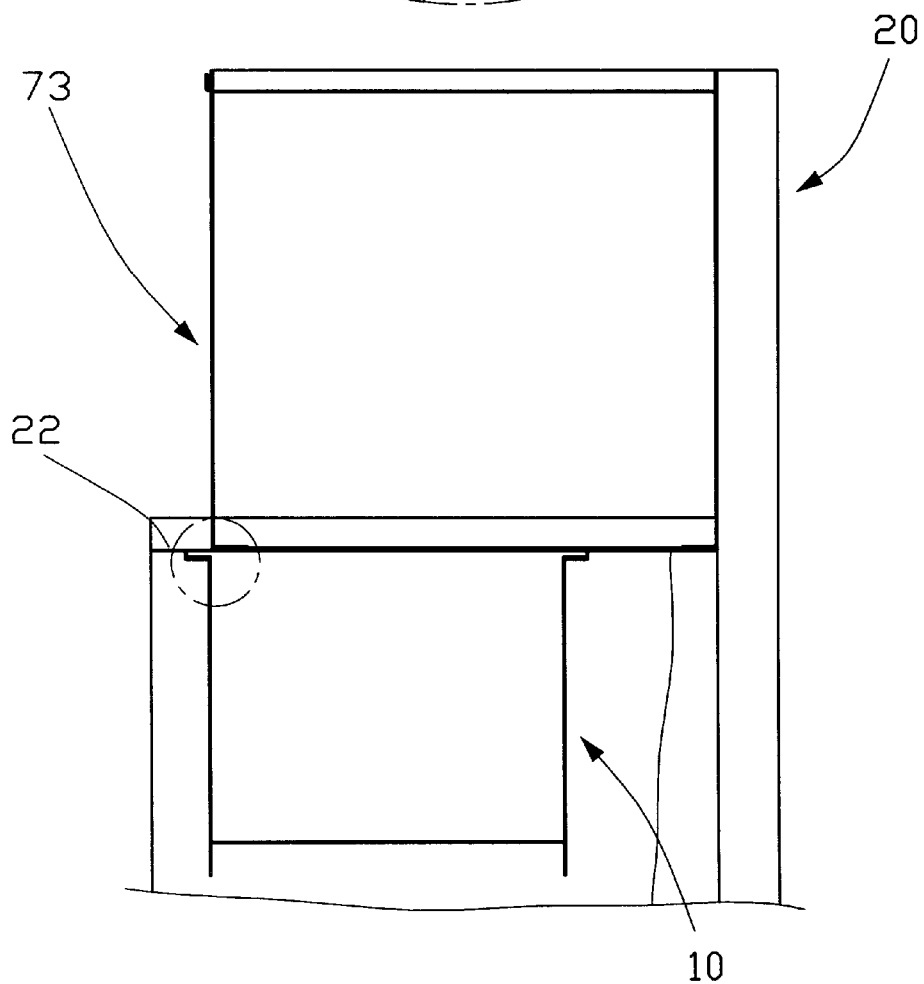
FIG. 3A is a cross-sectional view taken along line III of FIG. 2A.
Figure 4:
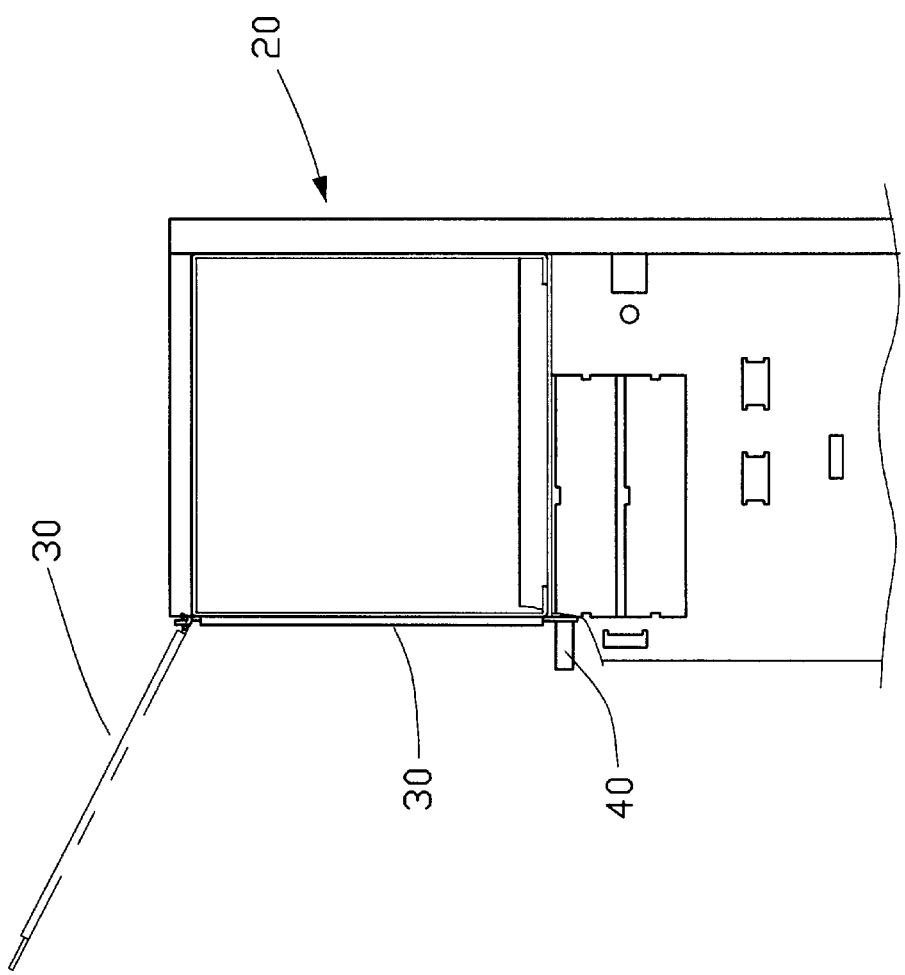
FIG. 4 is a partial elevational side view of the computer chassis showing the pivot range of the locking bracket of the present invention wherein the maximum pivot position is shown by the locking bracket in phantom lines.

In assembly, as seen in FIGS. 2A and 2B, the drive box 70 is slidably received between the chassis 20 and the base plate 22 from a lateral direction with regard to the chassis 20. The guiding rails of both the base plate 22 and the first wall 27 of the chassis 20 guide the in-line protrusions 75 of the drive box 70 to be engagedly embedded in the guiding slots 24 defined in both the base plate 22 and the first wall 27 of the chassis 20. By slightly compressing together the side walls 11, 12 of the drive cage 10, the guiding bars 15 of the drive cage 10 are brought to be retained in the retaining slots 29 defined by the bending tangs 25 of the base plate 22 thereby mounting the drive cage 10 to a bottom surface of the base plate 22 (best seen in FIGS. 3A and 3B).

The slot 35 then receives the bend 34 of the locking bracket 30 thereby pivotably mounting the locking bracket 30 to the chassis 20. The cutout 36 provides the bend 34 with clearance so that the locking bracket 30 can pivot at least ninety degrees with respect to the first wall 27 of the chassis 20 (seen in FIG. 4). The first hole 32, the slot 35, the second hole, the cutout 36 and the notch 26 are all defined in aligning positions so that the locking bracket 30 pivots downward to abut the left surface 73 of the drive box 70 and the left side wall 12 of the drive cage 10, and is received in the notch 29 whereby the bolt 50 extends through the first hole 32 thereof. The thumbscrew 40 threadedly engages with the bolt 50 to secure the locking bracket 30 between the left side wall 12 of the drive cage 10 and the thumbscrew 40 thereby restricting further movement of the drive cage 10 along the direction of the slots 29, and also preventing the drive box 70 from moving laterally with regard to the chassis 20. Therefore, the drive cage 10 and the drive box 70 are securely received within the computer chassis 20 in position.

The above disclosures indicate that the drive housing fixing means of the present invention does not require the utilization of any external tools to securely mount a drive cage 10 and drive box 70 to a computer chassis 20. Only a manual turning of one thumbscrew 40 is necessary to install or remove the drive cage 10 and the drive box 70. Thus, access to the drive housing is easily accomplished.

Furthermore, only one pivotably mounted locking bracket 30 is utilized to fix the drive cage 10 and the drive box 70 to the chassis 20 which simplifies the structure of the fixing means and shortens assembly time. Thus, manufacturing costs are reduced.

While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by the appended claims.

What is claimed is:

1. A drive housing assembly for use within a computer chassis comprising:
   an elongate locking bracket defining a first hole in a first end and forming a bend on a second end;
   a thumbscrew; and
   a bolt;
   a drive cage defining a second hole in a side wall thereof, said second hole fixedly receiving the bolt extending through the first hole of the locking bracket, the thumbscrew engaging with the bolt and securing the locking bracket between the side wall of the drive cage and the thumbscrew, and the bend of the locking bracket extending through a slot and a cutout defined in a first wall and a second wall of the computer chassis, respectively.

2. The fixing means in accordance with claim 1, wherein the locking bracket is pivotably mounted to the chassis.

3. The fixing means in accordance with claim 1, wherein the bolt extends outside the drive cage.

4. The fixing means in accordance with claim 1, wherein the first hole, the slot, the second hole and the cutout are each defined in predetermined positions whereby the locking bracket pivots downward to receive the bolt in the first hole thereof.

5. A drive housing assembly adapted to be mounted to a computer enclosure, including:
   a drive cage slidably positioned by one side of a base plate of the chassis;
   a drive box slidably positioned by the other side of the base plate of the chassis; and
   a bracket having a first end and an opposite second end; wherein the bracket is pivotally mounted to the chassis at the second end and fastened to the drive cage at the first end and the bracket abuts the drive box so that the drive cage and the drive box can not move relative to the chassis.

6. The drive housing assembly in accordance with claim 5, wherein the drive box is attached to the other side of the base plate along an installation direction before the bracket is fastened to the drive cage.

7. An arrangement of securely mounting a drive housing to a chassis, wherein said drive housing includes a drive box and a drive cage positioned by two opposite sides of a base plate of the chassis and means for respectively guiding movements of the drive box and the drive cage along a first direction and a second direction perpendicular to said first direction, a pivotal bracket including a first end hinged to the chassis and a second end fastened to the drive cage so as to retain the drive cage and the drive box in position with regard to the chassis.

8. A method of securing a drive box to a computer chassis, the steps including,
   providing a bracket having a first end hinged to the chassis and a second end with a hole moveable along an arc path;
   moving the bracket to an upper horizontal position for allowing the drive box to be installed into the chassis along a first direction;
   moving the bracket to a lower vertical direction for abutting the drive box;
   providing a bolt mounted to the chassis and extending through the hole on the second end of the bracket; and
   providing a thumbscrew threadedly engaging the bolt to secure the bracket in a locking manner for preventing the drive box from moving in a second direction opposite to said first direction.

9. The drive housing assembly in accordance with claim 5, wherein the base plate forms a pair of rails for guiding the drive box sliding into the chassis.

10. The drive housing assembly in accordance with claim 9, wherein the drive box forms in-line protrusions attached to the rails for guiding the drive box sliding into the chassis.

* * * * *